| (12) | United States Patent | (10) Patent No.: | US 11,319,197 B2 |
|---|---|---|---|
| | Fretz et al. | (45) Date of Patent: | May 3, 2022 |

(54) FAIRLEAD WITH INTEGRATED REMOTE SOCKET

(71) Applicant: Warn Industries, Inc., Clackamas, OR (US)

(72) Inventors: Darren G. Fretz, Oregon City, OR (US); Eric Vaughn, Milwaukie, OR (US)

(73) Assignee: WARN INDUSTRIES, INC., Clackamas, OR (US)

( * ) Notice: Subject to any disclaimer, the term of this patent is extended or adjusted under 35 U.S.C. 154(b) by 14 days.

(21) Appl. No.: 17/082,760

(22) Filed: Oct. 28, 2020

(65) Prior Publication Data

US 2021/0130143 A1    May 6, 2021

Related U.S. Application Data

(60) Provisional application No. 62/929,363, filed on Nov. 1, 2019.

(51) Int. Cl.
*B66D 1/36* (2006.01)
*B66D 1/46* (2006.01)

(52) U.S. Cl.
CPC ............... *B66D 1/36* (2013.01); *B66D 1/46* (2013.01)

(58) Field of Classification Search
CPC ... B66D 1/36; B66D 1/46; B66D 1/48; B66D 1/485
See application file for complete search history.

(56) References Cited

U.S. PATENT DOCUMENTS

| 4,235,394 | A * | 11/1980 | Fry | .................... | B65H 54/2854 |
|---|---|---|---|---|---|
| | | | | | 242/397.3 |
| 10,202,265 | B2 * | 2/2019 | Hall | ........................ | B66D 1/28 |
| 10,294,087 | B2 * | 5/2019 | Hall | ....................... | B66D 1/485 |
| 10,443,793 | B2 * | 10/2019 | Fretz | ....................... | B63B 21/14 |
| 10,633,229 | B2 * | 4/2020 | August | .................... | B66D 1/18 |
| 10,773,934 | B2 * | 9/2020 | Fanello | .................... | B66D 1/36 |

* cited by examiner

*Primary Examiner* — Michael E Gallion
(74) *Attorney, Agent, or Firm* — K&L Gates LLP

(57) ABSTRACT

Systems are provided for fairleads, including a frame. The frame includes a first opening and a second opening. The first opening extends through the frame from a front-facing surface of the frame to a rear-facing surface of the frame. The second opening extends through the frame from the front-facing surface of the frame to the rear-facing surface of the frame. A cable extends through the first opening.

19 Claims, 2 Drawing Sheets

FAIRLEAD WITH INTEGRATED REMOTE SOCKET

PRIORITY CLAIM AND CROSS REFERENCE TO RELATED APPLICATIONS

The present application claims priority to and the benefit of U.S. Provisional Patent Application No. 62/929,363, entitled "Fairlead With Integrated Remote Socket," filed on Nov. 1, 2019, the entire contents of which are incorporated by reference herein and relied upon.

FIELD

The present disclosure relates generally to systems for guiding and controlling retractable ropes, lines, and cables.

BACKGROUND

A fairlead, such as a hawse fairlead, may be used to guide and restrict lateral movement of a cable, as the cable is pulled through the fairlead. Specifically, the cable may extend through an opening in the fairlead and lateral movement of the cable may be constrained to an area within the opening in the fairlead. Fairleads may be implemented with winches, hoists, and any other related applications where a cable is subjected to bi-directional pulling motion. In particular, a fairlead may be mounted to a device, such as to a front of a vehicle or to a front of a winch on a vehicle, to guide the cable of the device.

In this particular example, the winch may be controlled by a user via a remote, such as a hand-held remote. This hand-held remote is typically wired directly to the winch, to provide the user with self-directed control of the various winching operations. However, physically connecting the hand-held remote (and its wiring) to the winch is often difficult. For example, winches may be disposed in inaccessible, or partially-inaccessible, locations, such as behind a bumper of a vehicle or recessed inside of a vehicle mount. In these configurations, it is difficult for the user to access the winch to couple wiring from the remote to the winch itself. More generally, it is inefficient for the user to connect a hand-held remote to any inconvenient location on the winch.

Improved fairleads, and related systems for integrating hand-held remote connectivity, are therefore needed.

SUMMARY

The fairleads and related systems disclosed herein improve on current winch technology, by providing an integrated remote socket that can be advantageously used to provide wired communication with a hand-held remote and/or other related electronic peripherals, for winch control and other related purposes.

In light of the disclosure, and without limiting the scope of the invention in any way, in a first aspect of the present disclosure, which may be combined with any other aspect listed herein unless specified otherwise, a fairlead includes a frame. The frame includes a first opening and a second opening. The first opening extends through the frame from a front-facing surface of the frame to a rear-facing surface of the frame. The second opening extends through the frame from the front-facing surface of the frame to the rear-facing surface of the frame. A cable extends through the first opening.

In a second aspect oft present disclosure, which may be combined with any other aspect listed herein unless specified otherwise, the second opening includes a removable cover.

In a third aspect of the present disclosure, which may be combined with any other aspect listed herein unless specified otherwise, an electrical socket is disposed within the second opening.

In a fourth aspect of the present disclosure, which may be combined with any other aspect listed herein unless specified otherwise, the fairlead includes electrical wiring extending from the electrical socket, at the rear-facing surface of the frame, to a winch, such that the electrical socket is in wired communication with the winch.

In a fifth aspect of the present disclosure, which may be combined with any other aspect listed herein unless specified otherwise, a hand-held remote control is configured to be coupled to the electrical socket such that, when the hand-held remote control is coupled to the electrical socket, the hand-held remote control is in wired communication with the winch.

In a sixth aspect of the present disclosure, which may be combined with any other aspect listed herein unless specified otherwise, the frame is one of a metal, metal alloy, metal composite, and a polymer.

In a seventh aspect of the present disclosure, which may be combined with any other aspect listed herein unless specified otherwise, the fairlead includes a plurality of mounting apertures. Each of the plurality of mounting apertures extends through the frame from the front-facing surface of the frame to the rear-facing surface of the frame.

In an eighth aspect of the present disclosure, which may be combined with any other aspect listed herein unless specified otherwise, a fairlead includes a frame with a first opening and a second opening. A rope or cable extends through the first opening. An electrical socket is disposed within the second opening.

In a ninth aspect of the present disclosure, which may be combined with any other aspect listed herein unless specified otherwise, the second opening includes a removable cover.

In a tenth aspect of the present disclosure, which may be combined with any other aspect listed herein unless specified otherwise, the fairlead includes electrical wiring extending from the electrical socket, at a rear-facing surface of the frame, to a winch, such that the electrical socket is in wired communication with the winch.

In an eleventh aspect of the present disclosure, which may be combined with any other aspect listed herein unless specified otherwise, a hand-held remote control is configured to be coupled to the electrical socket such that, when the hand-held remote control is coupled to the electrical socket, the hand-held remote control is in wired communication with the winch.

In a twelfth aspect of the present disclosure, which may be combined with any other aspect listed herein unless specified otherwise, the frame is one of a metal, metal alloy, metal composite, and a polymer.

In a thirteenth aspect of the present disclosure, which may be combined with any other aspect listed herein unless specified otherwise, the fairlead includes a plurality of mounting apertures. Each of the plurality of mounting apertures extends through the frame from a front-facing surface of the frame to a rear-facing surface of the frame.

In a fourteenth aspect of the present disclosure, which may be combined with any other aspect listed herein unless specified otherwise, a fairlead includes a frame, including a first opening and a recessed electrical socket. The first opening extends through the frame from a front-facing surface of the frame to a rear-facing surface of the frame. The recessed electrical socket is integrally formed with the frame.

In a fifteenth aspect of the present disclosure, which may be combined with any other aspect listed herein unless specified otherwise, the fairlead includes electrical wiring extending from the recessed electrical socket to a winch, such that the recessed electrical socket is in wired communication with the winch.

In a sixteenth aspect of the present disclosure, which may be combined with any other aspect listed herein unless specified otherwise, a hand-held remote control is configured to be coupled to the recessed electrical socket such that, when the hand-held remote control is coupled to the recessed electrical socket, the hand-held remote control is in wired communication with the winch.

In a seventeenth aspect of the present disclosure, which may be combined with any other aspect listed herein unless specified otherwise, the frame is one of a metal, metal alloy, metal composite, and a polymer.

In an eighteenth aspect of the present disclosure, which may be combined with any other aspect listed herein unless specified otherwise, the frame including the recessed electrical socket are a single piece injection molded component.

In a nineteenth aspect of the present disclosure, which may be combined with any other aspect listed herein unless specified otherwise, the front-facing surface of the frame and the rear-facing surface of the frame are in parallel.

In a twentieth aspect of the present disclosure, which may be combined with any other aspect listed herein unless specified otherwise, the fairlead includes a plurality of mounting apertures. Each of the plurality of mounting apertures extends through the frame from the front-facing surface of the frame to the rear-facing surface of the frame.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE FIGURES

Understanding that figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION

Figure 1:
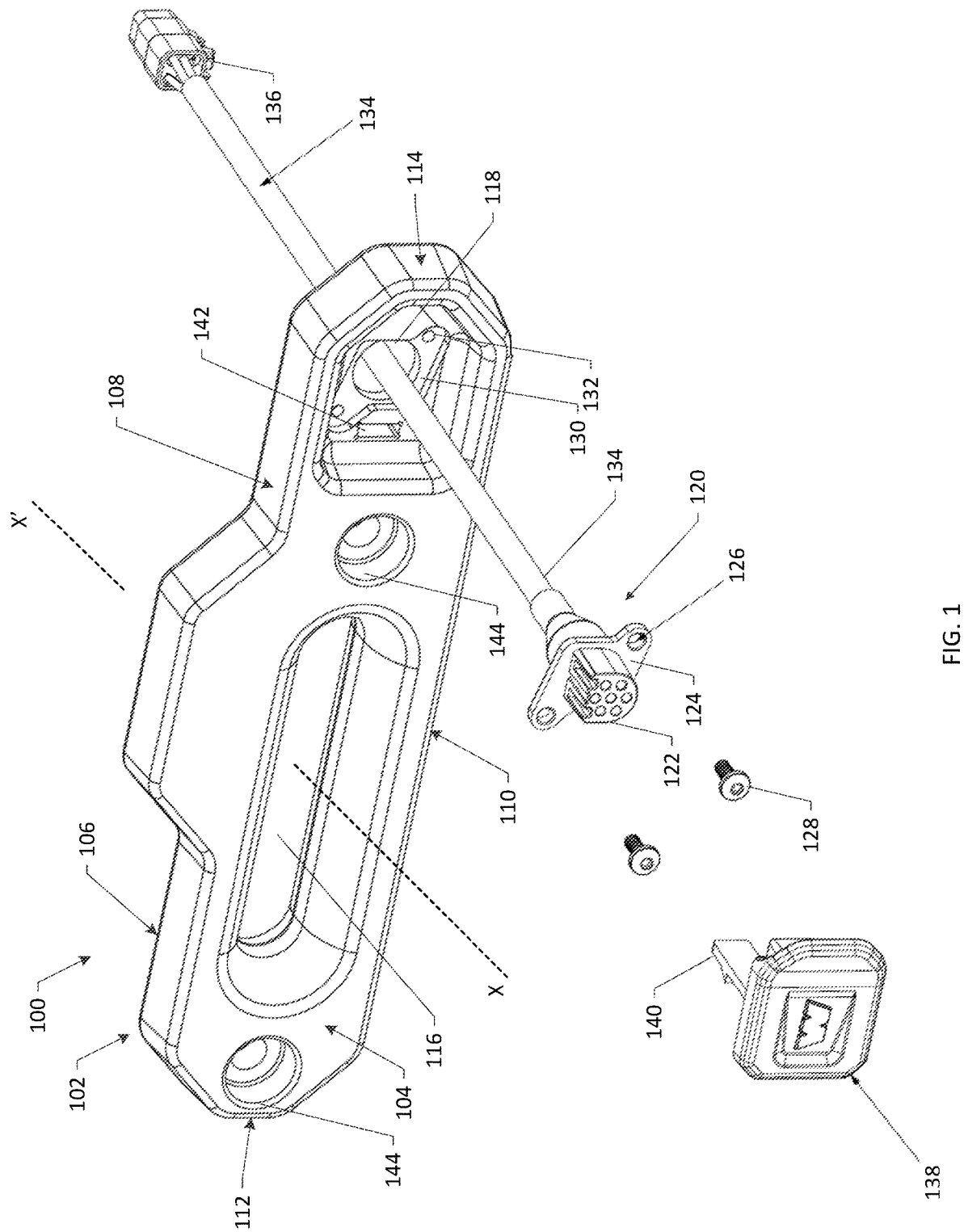
FIG. 1 illustrates an exploded perspective view of a fairlead, according to an example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specific the presence of stated features, integers, steps, operations, elements, and/or components, but do not preclude the presence or additional of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent"). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a fairlead 100 includes a fairlead frame 102. The frame 102 includes a front-facing surface 104, a rear-facing surface 106, a top-facing surface 108, a bottom-facing surface 110, and a first side surface 112 opposite a second side surface 114. In an example embodiment, the side surfaces 112 and 114 may be the same and/or similar size and shape. Further, the side surfaces 112 and 114, may each include three substantially planar edges, where one of the edges of each of the side surfaces 112 and 114 is approximately orthogonal to the top-facing surface 108 and bottom-facing surface 110. However, in other examples, each of the side surfaces 112 and 114 may include more or less than three edges. For example, the side surfaces 112 and 114 may include a single planar edge that connects the top-facing and bottom-facing surfaces 108 and 110.

In some examples, one or more of the top-facing surface 108 may be parallel the bottom-facing surface 110, the front-facing surface 104 may be parallel the rear-facing surface 106, and at least one of the edges of the first side surface 112 may be parallel to at least one of the edges of the second side surface 114. A central axis X-X' of the frame 102 is shown in FIG. 1, where the central axis X-X' may extend through the frame 102 from the front-facing surface 104 to the rear-facing surface 106. Thus, the central axis X-X' may be perpendicular to the front-facing surface 104 and/or rear-facing surface 106.

Figure 2B:
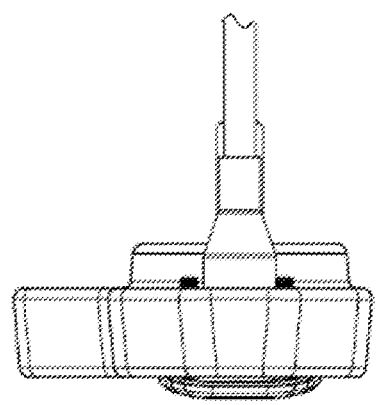
FIGS. 2A to 2C illustrate front, side, and top views, respectively, of a fairlead, according to example embodiments of the present disclosure.

In the description herein, a "thickness" of the fairlead frame 102 may be used to define the physical extent of the frame 102 along the axis X-X'. Thus, the thickness of the frame 102 may refer to the distance between the front-facing surface 104 and the rear-facing surface 106. In an embodiment, with reference to FIG. 1, fairlead frame 102 has uniform thickness from the front-facing surface 104 to the rear facing surface 106. In a different embodiment, with reference to FIGS. 2A to 2C, fairlead frame 202 may have two or more different thicknesses. For example, fairlead frame 202 has a first thickness at or near a first opening and a second thickness at or near a second opening (as described in greater detail herein).

Similarly, a "width" of the frame 102 may generally be used to refer to the distance between the side surfaces 112 and 114, and a "height" of the frame 102 may generally be used to refer to the distance between the top-facing surface 108 and the bottom-facing surface 110.

The fairlead frames herein, including fairlead frame 102 and fairlead frame 202, may be constructed from a polymer, composite polymer, plastic, or the like. Alternatively, the fairlead frames 102, 202 may be constructed from a metal, metal alloy, or metal composite such as aluminum. In an embodiment, the entire fairlead frame 102, 202 is cast or single-piece injection molded.

Referring back specifically to FIG. 1, the frame 102 includes a first opening 116 through which a rope and/or cable (not shown) may extend. For example, a cable may extend along the central axis X-X' through first opening 116. In this way, the first opening 116 and frame 102 restrict lateral movement of the cable, as the cable is pulled through the fairlead 100. While generally referred to as a cable, it should be appreciated that the disclosure herein encompasses cables, ropes, braided wire, or any other related pulling components that can be expected to be pulled through fairlead 100.

The first opening 116 extends through an entirety of the frame 102, from the front-facing surface 104 to the rear-facing surface 106, such that the cable may extend through the entirety of fairlead 100 (in the X-X' direction). Though the first opening 116 extends through the entirety of frame 102, it should be appreciated that the cross-sectional area of the first opening 116 may vary along the thickness of frame 102. For example, portions of the first opening 116 may be beveled, chamfered, filleted, or the like on one or both of the front-facing surface 104 and the rear-facing surface 106. In some examples, cross-sections of the first opening 116, taken along a plane parallel to the plane defined by the rear-facing surface 106 and/or front-facing surface 104, at the front-facing surface 104 and rear-facing surface 106 may define the same or similar shape. Further, in some examples, cross-sections of the first opening 116 may define the same or similar shape along the axis X-X' between the front-facing surface 104 and the rear-facing surface 106. Thus, in an example, substantially all of the cross-sections of the first opening 116 may be concentric. As such, the first opening 116 may be symmetric with respect to the central axis X-X'. In a different example, a cross-section of the first opening 116 at the front-facing surface 104 is larger than a cross-section of the first opening 116 at the rear-facing surface 106.

In an embodiment, the first opening 116 is centrally positioned within the frame 102. In other embodiments, the first opening 116 is offset within the frame 102. For example, the first opening 116 may be positioned more proximate to side surface 112 than to side surface 114, as illustrated in FIG. 1.

The frame 102 further includes a second opening 118 that extends through an entirety of frame 102. It should be appreciated that when either first opening 116 or second opening 118 extends through frame 102, at least a portion of the opening is extending through the entirety of the frame 102, in order to constitute an "opening."

In an embodiment, second opening 118 is configured to receive an electrical socket 120. As described in greater detail herein, in an embodiment, electrical socket 120, when mounted, is disposed entirely within second opening 118 such that it does not extend beyond a plane defined by the front-facing surface 104 of the frame 102. Electrical socket 120 includes a plurality of electrical connections 122. For example, the plurality of electrical connections 122 include female electrical connectors for engaging with an external device. In an embodiment, the external device (not shown) is a hand-held remote configured for controlling a winch. Namely, the external device can be "plugged-in" to the electrical socket 120, such that the external device is in wired electrical communication with the electrical socket 120.

Electrical socket 120 further includes a mounting plate 124. Mounting plate 124 includes a specific geometrical profile, such as a diamond shape, for keyed fitting within second opening 118. It should be appreciated, however, that alternative geometrical profiles are contemplated. Mounting plate 124 further includes a plurality of mounting holes 126, each of which is configured to receive one of a plurality of screws 128, such that electrical socket 120 may be securely fastened to second opening 118. More specifically, second opening 118 includes a recess 130, with a geometrical profile matching the geometric profile of mounting plate 124; however, the profile of recess 130 is slightly larger than that of mounting plate 124, such that mounting plate 124 fits "inside" of recess 130. Similarly, recess 130 includes a plurality of mounting holes 132, configured to match with mounting holes 126. In an embodiment, the plurality of screws 128 extend through the plurality of mounting holes 126, 132, and are fastened in place with a nut (at the rear-facing surface 106), to securely fasten electrical socket 120 to second opening 118. In a different embodiment, the plurality of mounting holes 132 at recess 130 are threaded, such that the plurality of screws 128 directly engage with the plurality of mounting holes 132 on the frame 102, to securely fasten electrical socket 120 to second opening 118.

Electrical socket 120 further includes an electrical cable 134, extending away from the rear-facing surface 106. The electrical cable 134 is configured to transmit electrical signals from the plurality of electrical connections 122 to an external connector 136. In an embodiment, external connector 136 is coupled to a winch, such as a control pack of the winch. Similarly, a hand-held remote may be removably coupled to electrical socket 120 at the front-facing surface 104 of fairlead 100. In this way, the hand-held remote may send signals, directly to the winch, via electrical socket 120, electrical cable 134, an electrical connector 136.

In an embodiment, the entire frame 102 including the electrical socket 120 is single-piece injection molded. In this embodiment, mounting plate 124 and recess 130 are integral components of the frame 102. More generally, electrical socket 120 is integrally formed with frame 102.

Figure 2A:
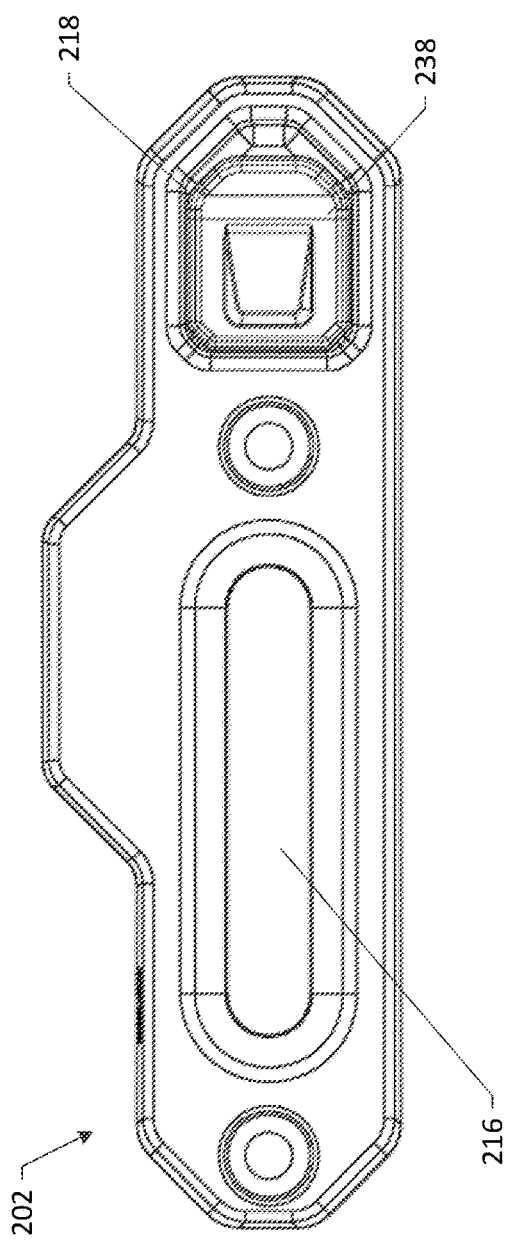
Figure 2C:
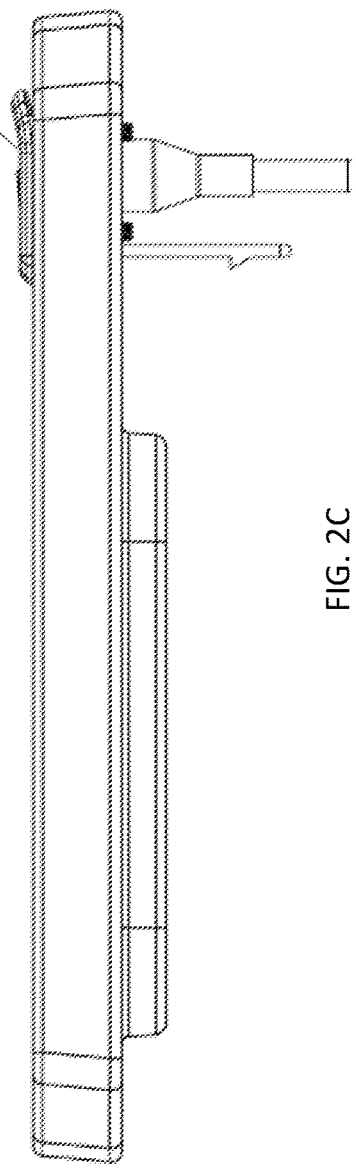

In an embodiment, second opening 118 further includes a guard 138, configured to protect electrical socket 120 from external environmental factors such as dust, moisture, and the like. Guard 138 may include an attachment feature 140, such as a snap-lock. In an embodiment, attachment feature 140 extends through an entirety of the frame 102. In a specific embodiment, frame 102 includes slot 142, extending through the entirety of frame 102. Attachment feature 140 is configured to translate through slot 142, to secure guard 138 to the frame 102. Once secured in place, the user may reach, to the rear-facing surface 106, release the attachment feature 140, and then remove the guard 138 from the second opening 118. FIG. 2A illustrates a guard 238 when attached to frame 202.

Referring back to FIG. 1, the fairlead frame 102 may further include one or more bores 144 including a central portion that may extend through an entirety of the frame 102 in the direction of the axis X-X' and an outer portion surrounding the central portion that extends to the front-facing surface of the bore 144 which may be arranged at the front-facing surface 104. Specifically, the central portion may define smaller cross-sectional area than the outer portion, and the outer portion may extend from the front-facing surface 104 of the frame 102 into the frame 102, up to the central portion. The central portion, may then extend from the outer portion to the rear-facing surface 106 of the frame 102. The transition between the central portion and outer portion may be defined by a step. Thus, the bores 144 may extend from the front-facing surface 104 to the rear-facing surface 106. As shown in FIG. 1, the frame 102 may include two mounting bores 144, disposed on opposite sides of the first opening 116. However, in other examples, the frame 102 may include more or fewer than two bores 144. The bores 144 may be sized to receive fasteners such as bolts, screws, and the like, for physically securing the fairlead 100 to a desired structure, such as a front of a vehicle or a front of a winch.

Thus, one or more bolts may extend through the bores 144 and into the desired structure to which the fairlead 100 is to be attached, to physically couple the fairlead 100 to the desired structure. In one example, an elongated end of the bolt or screw (which may be threaded) may extend through the bore 144 and past the rear-facing surface 106 and an inner side of a head of the bolt or screw may be in face-sharing contact with a front-facing surface of the central portion, and thus the head of the bolt or screw may be arranged within the outer portion of the bore 144. In this way, the head of the bolt or screw may fit within the outer portion of the bore 144, and the elongated end of the bolt or screw may extend through the central portion of the bore 144, and out of the back of the frame 102 through the rear-facing surface 106. In some examples, a front-facing surface of the head of the bolt or screw may be flush with the front-facing surface 104 of the frame 102. However, in other examples, the front-facing surface of the head of the bolt or screw may be recessed or raised relative to the front-facing surface 104 of the frame 102.

As previously noted, in an embodiment, fairlead frame 102 has uniform thickness from the front-facing surface 104 to the rear facing surface 106. It should be appreciated, however, that the thickness of the fairlead frame can vary. Namely, with reference to FIGS. 2A to 2C, fairlead frame 202 has two or more different thicknesses. Specifically, fairlead frame 202 has a first thickness near its first opening 216; fairlead frame 202 has a second thickness near its second opening 218. In an embodiment the first thickness is larger than the second thickness. For example, a larger thickness of fairlead frame 202 may be optimal near first opening 216, due to increased mechanical stresses at that location of fairlead frame 202 with respect to a cable translating through first opening 216; by comparison, a smaller thickness of fairlead frame 202 may be optimal near second opening 218, due to reduced mechanical stresses at that location of fairlead frame 202.

Turning back to FIG. 1, as discussed briefly above, the fairlead 100 may be coupled to a winch or to a vehicle (in front of the winch), to guide the winch cable during winching operations. In a different example, the fairlead 100 may be coupled to a hoist, or a bracket tor support near the hoist, to guide the hoist cable during hoisting operations. In yet another different example, the fairlead 100 may be coupled to a ship or boat, for guiding one or more of mooring lines, anchoring cables, and the like.

When the fairlead 100 is coupled to a front of a vehicle, such as a passenger car, SUV, truck, ATV, sports car, or the like, the winch may include a motor for operating the winch. In particular the motor may provide a driving force for pulling the winch cable. This motor, and its related circuitry, are disposed "behind" the fairlead 100. The motor and its related circuitry are difficult, if not impossible, to easily access. However, because the fairlead 100 has a second opening 118 with electrical socket 120 at the front-facing surface 104, the user is able to quickly and efficiently access electrical socket 120, such as to connect a hand-held remote. This electrical socket 120 is in wired communication with the motor and its related circuitry. Thus, via electrical socket 120 and the hand-held remote, the user can control various winching operations without having to access the winch or any other inaccessible components that are behind the fairlead 100.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A fairlead, comprising:
a frame, including a first opening and a second opening, wherein the first opening extends through the frame from a front-facing surface of the frame to a rear-facing surface of the frame, wherein the second opening extends through the frame from the front-facing surface of the frame to the rear-facing surface of the frame, wherein a cable extends through the first opening, and wherein an electrical socket is disposed within the second opening.

2. The fairlead of claim 1, wherein the second opening includes a removable cover.

3. The fairlead of claim 1, further comprising electrical wiring extending from the electrical socket, at the rear-facing surface of the frame, to a winch, such that the electrical socket is in wired communication with the winch.

4. The fairlead of claim 3, wherein a hand-held remote control is configured to be coupled to the electrical socket such that, when the hand-held remote control is coupled to the electrical socket, the hand-held remote control is in wired communication with the winch.

5. The fairlead of claim 1, wherein the frame is one of a metal, metal alloy, metal composite, and a polymer.

6. The fairlead of claim 1, further comprising a plurality of mounting apertures, wherein each of the plurality of mounting apertures extends through the frame from the front-facing surface of the frame to the rear-facing surface of the frame.

7. A fairlead, comprising: a frame, including a first opening and a second opening extending from front-facing surface, through the frame, to a rear-facing surface, wherein a cable extends through the first opening, and wherein an electrical socket is disposed within the second opening.

8. The fairlead of claim 7, wherein the second opening includes a removable cover.

9. The fairlead of claim 7, further comprising electrical wiring extending from the electrical socket, at a rear-facing surface of the frame, to a winch, such that the electrical socket is in wired communication with the winch.

10. The fairlead of claim 9, wherein a hand-held remote control is configured to be coupled to the electrical socket such that, when the hand-held remote control is coupled to the electrical socket, the hand-held remote control is in wired communication with the winch.

11. The fairlead of claim 1, wherein the frame is one of a metal, metal alloy, metal composite, and a polymer.

12. The fairlead of claim 1, further comprising a plurality of mounting apertures, wherein each of the plurality of mounting apertures extends through the frame from a front-facing surface of the frame to a rear-facing surface of the frame.

13. A fairlead, comprising: a frame, including a first opening and a recessed electrical socket, wherein the first opening extends through the frame from a front-facing surface of the frame to a rear-facing surface of the frame, and wherein the recessed electrical socket is integrally formed with the frame and disposed within a second opening, extending through the frame from the front-facing surface of the frame to the rear-facing surface of the frame.

14. The fairlead of claim 13, further comprising electrical wiring extending from the recessed electrical socket to a winch, such that the recessed electrical socket is in wired communication with the winch.

15. The fairlead of claim 14, wherein a hand-held remote control is configured to be coupled to the recessed electrical socket such that, when the hand-held remote control is coupled to the recessed electrical socket, the hand-held remote control is in wired communication with the winch.

16. The fairlead of claim 13, wherein the frame is one of a metal, metal alloy, metal composite, and a polymer.

17. The fairlead of claim 13, wherein the frame including the recessed electrical socket are a single piece injection molded component.

18. The fairlead of claim 13, wherein the front-facing surface of the frame and the rear-facing surface of the frame are parallel.

19. The fairlead of claim 13, further comprising a plurality of mounting apertures, wherein each of the plurality of mounting apertures extends through the frame from the front-facing surface of the frame to the rear-facing surface of the frame.

* * * * *